Oct. 14, 1958 L. V. WAY, JR 2,856,178
PIPE CUTTING MACHINE
Filed Sept. 28, 1955 5 Sheets-Sheet 5
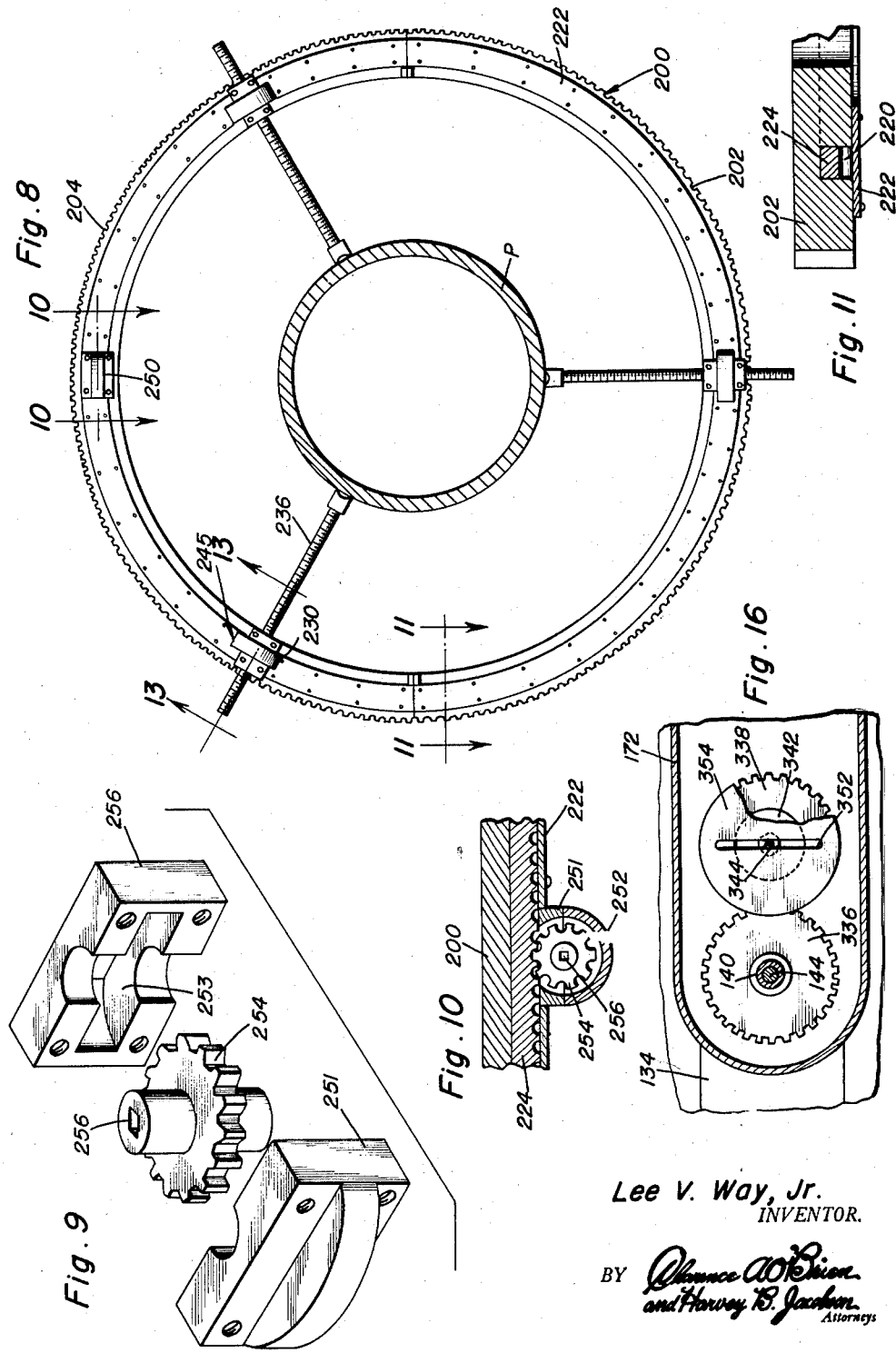
Lee V. Way, Jr.
INVENTOR.

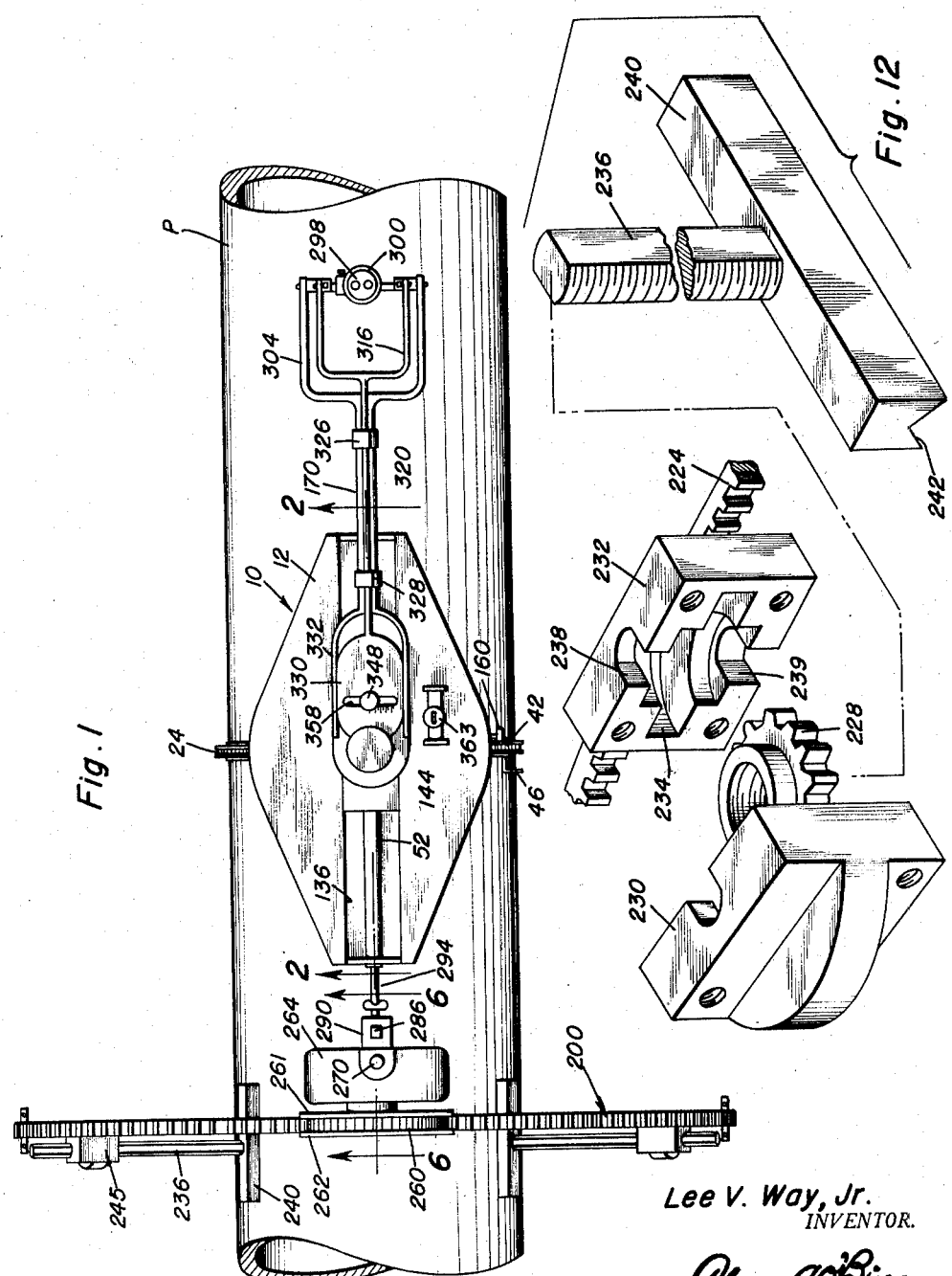

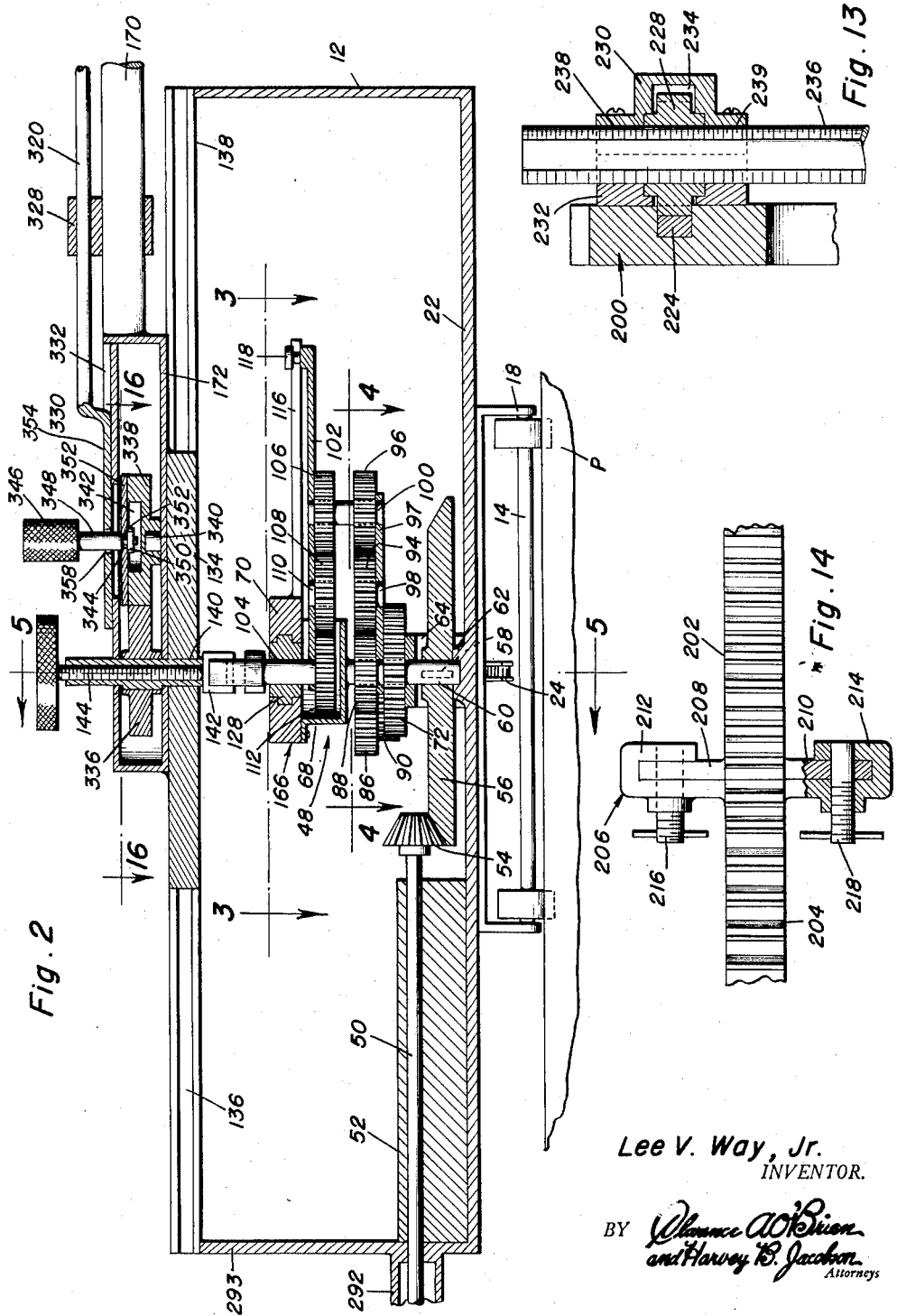

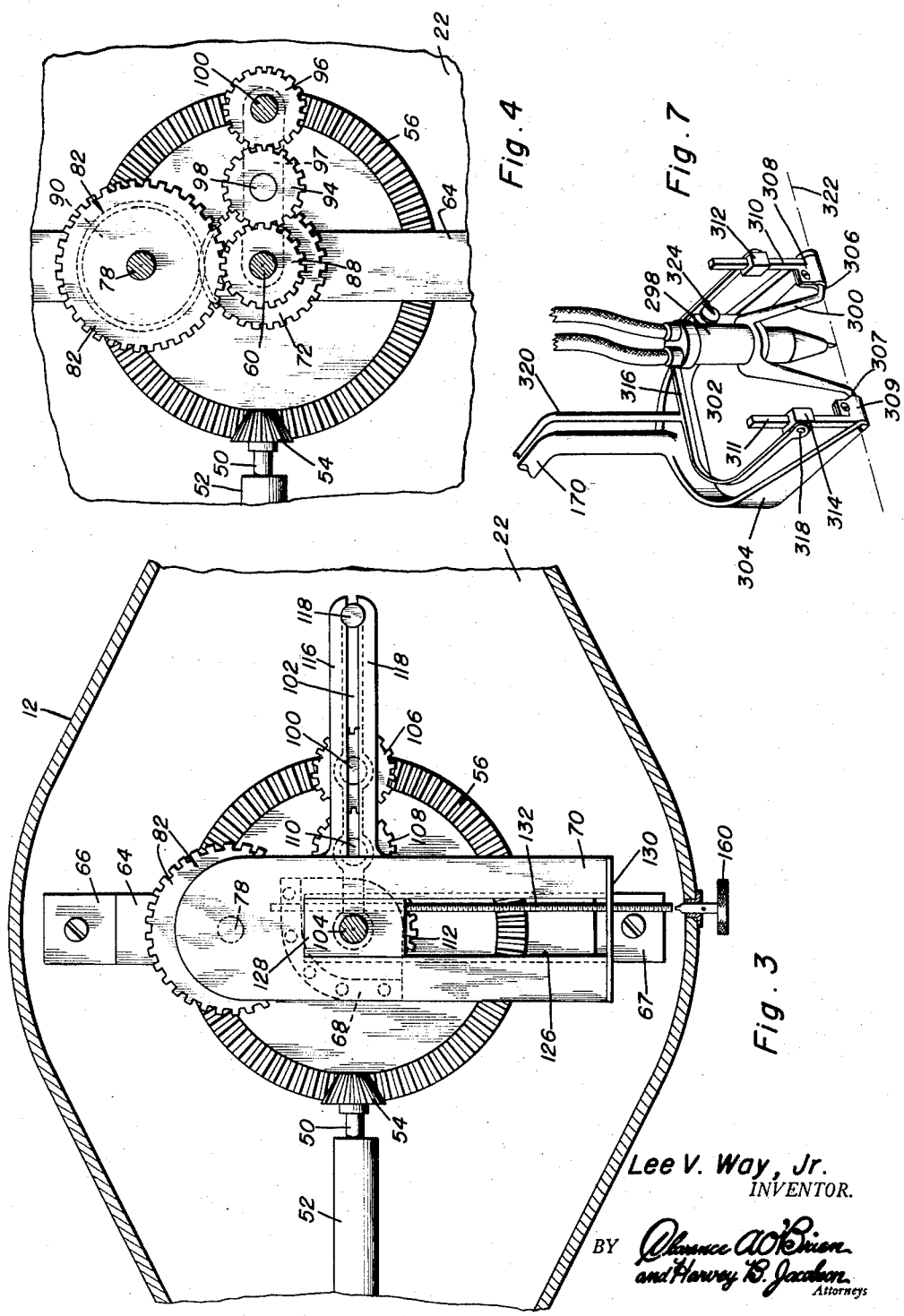

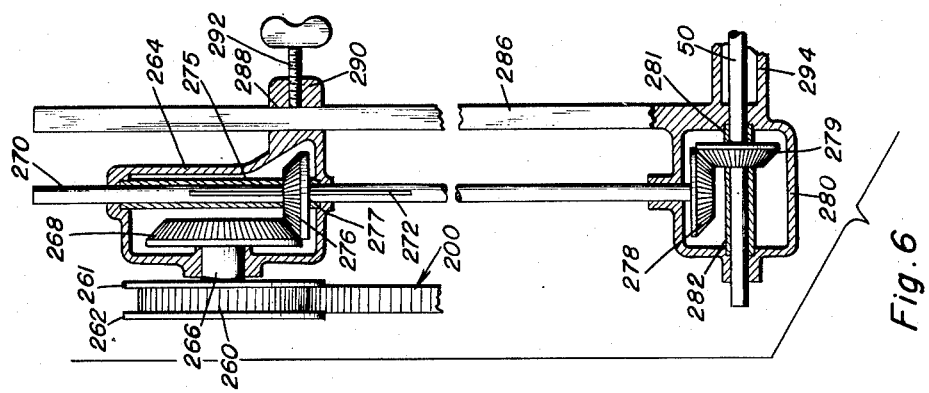
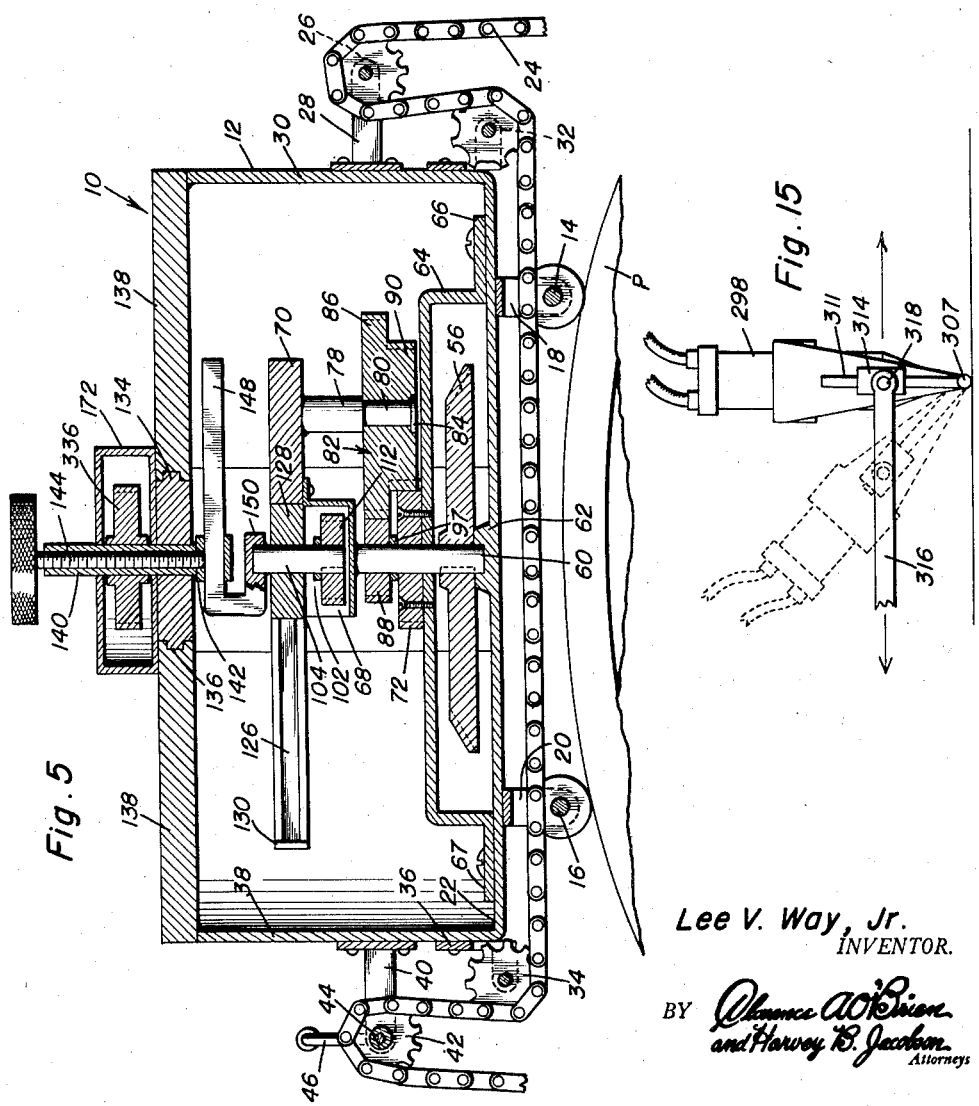

United States Patent Office 2,856,178
Patented Oct. 14, 1958

2,856,178
PIPE CUTTING MACHINE

Lee V. Way, Jr., Jackson Heights, Ohio

Application September 28, 1955, Serial No. 537,256

7 Claims. (Cl. 266—23)

This invention relates to machines for thermochemically cutting metal stock, and is a continuation-in-part of my copending application, Serial No. 473,660, filed December 7, 1954, now Patent No. 2,740,621, for Torch Guide for Cutting Ellipses.

Although various machines have been made for miter cutting pipe by thermochemical means, as a blowpipe, a considerable amount of this work is accomplished by hand at the present time. Failure to adopt existing equipment is attributable to the complexity of the present equipment, this complexity being both in construction and operation. It is a primary object of this invention to provide a pipe mitering and beveling apparatus which is readily moved from one job to another and which is accurate within the limits of accuracy of the blowpipe in making the cuts.

In making a miter cut, it is essential that the longitudinal axis of the blowpipe be pointed at all times toward the cut line on the opposite side of the pipe. In making a radial cut, the longitudinal axis of the blowpipe must point toward the center of the pipe at all times. Another object of the present invention is to provide an apparatus which is capable of making accurate miter and radial cuts in a pipe wherein the bevel of either the miter or the radial cut as measured relative to the angle of miter or radial cut is maintained absolutely constant throughout the entire cut.

A further object of this invention is to provide means for achieving the above described accuracy in bevel by having a blowpipe support mounted for pivotal movement about an axis which passes through the longitudinal axis of the blowpipe and as close to the burning flame contact with the pipe surface as possible in order that the blowpipe will not be moved farther from the pipe surface when the blowpipe support is angularly displaced during cutting operations.

In making a miter cut in a pipe, the blowpipe is moved longitudinally of the pipe while there is relative motion between the pipe and the blowpipe, and in addition, the blowpipe is tilted in order to obtain the correct bevel throughout the cut. An additional object of this invention is to provide means which afford two adjustments in connection with the tilting movement of the blowpipe, the first adjustment regulating the extent of pivotal movement of the blowpipe throughout the entire bevel cut and the other adjustment is to allow the blowpipe to be preset in order to establish an original angular position of the blowpipe from which the cutting operations commence.

Another important object of this invention is to provide means which adjustably fasten to the pipe in order to fit various diameter pipes, said means functioning to actuate a transmission at a rate proportional to the speed of movement of the blowpipe around the work piece pipe that is to be cut whereby the speeds of the various torch support movements that are derived from the transmission are functions of the speed of translation of the torch around the pipe. In this way, the burning rate that is most effective may be selected and maintained. This applies not only to the speed of translation of the blowpipe, but also the movement of the blowpipe longitudinally of the pipe to form the miter and the angular deflection or tilting to form the bevel on the miter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of the pipe cutting machine applied to a fragmentary part of a pipe and in position for use;

Figure 2 is an enlarged sectional view taken on the line 2—2 of Figure 1 and in the direction of the arrows;

Figure 3 is a fragmentary sectional view taken substantially on the line 3—3 of Figure 2 and in the direction of the arrows illustrating a part of the gear transmission;

Figure 4 is a sectional view taken on the line 4—4 of Figure 2 and in the direction of the arrows showing another part of the gear transmission;

Figure 5 is a transverse sectional view taken on the line 5—5 of Figure 2 and in the direction of the arrows;

Figure 6 is an enlarged sectional view taken on the line 6—6 of Figure 1 showing the means for transmitting rotation to the gear transmission but allowing for adjustment to accommodate various diameter pipes;

Figure 7 is a perspective view showing the torch holder together with portions of the means for reciprocating the holder in a plane parallel to the longitudinal axis of the pipe and a portion of the means for tilting the blowpipe holder or support about a pivot axis very close to or at the surface which is being cut;

Figure 8 is an elevational view of a ring gear together with adjustable means that are connected to it for holding it secure to one of a family of diameters of pipes with which they may be connected;

Figure 9 is an exploded perspective view of a pinion and its case used to actuate the adjustable means for clamping to a pipe;

Figure 10 is an enlarged transverse fragmentary sectional view showing the gear and case of Figure 9 in use;

Figure 11 is a transverse sectional view in enlarged scale taken on the line 11—11 of Figure 8 and illustrating particularly a gear with teeth on a lateral face thereof, these teeth being meshed with the gear of Figures 9 and 10 in order to be rotated in the actuation of the means for clamping the large outer ring gear to the pipe;

Figure 12 is an exploded perspective view of the means for fastening the outer ring gear to a pipe;

Figure 13 is an enlarged transverse sectional view taken on the line 13—13 of Figure 8 and in the direction of the arrows showing assembled the structure of Figure 12;

Figure 14 is a fragmentary elevational view showing that the large ring gear of Figure 8 is made in sections and fastened together in order to facilitate placing the ring gear around the pipe;

Figure 15 is an elevational view of the blowpipe support showing particularly the adjustment thereof in order to form the correct bevel for either miter or radial cuts, and this angularity achieved without displacing the torch tip from the original burning point; and Figure 16 is a fragmentary sectional view taken substantially on the plane of line 16—16 in Figure 2 and in the direction of the arrows.

Inasmuch as the invention is primarily useful in connection with cutting pipe, the pipe P is illustrated for the purpose of providing a typical example of work on which the principles of the invention may be practiced. A carriage 10 is mounted on the pipe P and comprises a housing 12 having axles 14 and 16 mounted in brackets 18 and 20 which depend from the bottom wall 22 of the housing. Wheels are carried by axles 14 and 16 and they rest on the surface of the pipe P thereby mounting the carriage for rotation on the circumference of the pipe. The means providing motive force for driving the carriage 10 around the pipe consist preferably of a chain 24 extending around the pipe P and entrained around an upper idler sprocket 26 which is mounted for rotation in a bracket 28 on the side 30 of housing 12. This chain is further entrained around a lower idler sprocket 32 on the same side 30 of the housing 12 and extends beneath the bottom wall 22 and the surface of a pipe P to a further idler sprocket 34 which is supported on a bracket 36, the latter being secured to side 38 of housing 12. An upper bracket 40 on side 38 has sprocket 42 mounted for rotation therein, this sprocket having a central non-circular opening, as square, accommodating the shank 44 of the drive crank 46. This crank is removable, and when inserted in the non-circular opening in sprocket 42, is used to rotate that sprocket around which chain 24 is entrained. This pulls the carriage 10 around the periphery of pipe P.

A gear transmission 48 which is extremely similar to the subject matter of the referenced copending patent application is mounted in the housing 12 and obtains its motivating force from shaft 50, the latter being rotated by means that are described subsequently (Figure 6). For an understanding of the operation of the transmission 48, it is sufficient to assume that shaft 50 which extends through the elongated bearing 52 on the bottom wall 22 obtains a rotative input and therefore rotates the pinion 54 that is enmeshed with bevel gear 56. This latter gear is keyed, as at 58, or otherwise rigidly connected to spindle 60 whose lower end is mounted in bearings 62 on or in the wall 22 of housing 12. A generally U-shaped support 64 having lateral flanges 66 and 67 at the ends thereof fixed to the wall 22, spans the bevel gear 56 and has an opening in it through which spindle 60 passes.

A laterally opening housing 68 is welded or otherwise rigidly fixed to the top end of spindle 60, and therefore, when the spindle rotates, the housing 68 rotates with it. A motion translation assembly including plate 70 is connected with the housing 68 by having the housing secured to the lower surface of plate 70. It is evident, therefore, that the plate 70 together with the assembly which is associated with it rotates one revolution for each single revolution of shaft 60, and the same holds true for each revolution of gear 56. Rotation of gear 56 is a function of the rotation of shaft 50. As the plate 70 rotates, so does every gear, except gear 72, between gears 56 and plate 70 moves around the spindle 60. Gear 72 is fixed, as by screws (Figure 5) to the support 64 and has a central opening through which the shaft 60 passes. Shaft 78 is secured to the plate 70 and is arranged parallel to the shaft 60 and laterally spaced therefrom. The lower end of shaft 78 has a reduced shank 80 on which the gear cluster 82 is mounted for rotation. An enlarged end 84 of the reduced shank 80 serves as a thrust bearing to prevent the cluster 82 from coming in contact with the support 64 and keeps it aligned so that the larger gear 86 of the cluster will remain always enmeshed with its pinion 88, and the smaller gear 90 of the cluster will remain always in engagement with the stationary gear 72. Pinion 88 is mounted for rotation on spindle 60 and is one-half the diameter of gear 86 so that there is a two-to-one ratio provided as the cluster on its shank 80 moves in a circle around shaft 60. This being the case, the gear 88 is rotated twice as fast and in an opposite direction to the rotation of bevel gear 56. As the gear 88 rotates, it imparts rotary movement to the idler 94 which in turn rotates gear 96 that is enmeshed therewith. Support plate 97 has an aperture in it through which shaft 60 extends, and the plate is disposed between gears 72 and 88. This plate 97 projecting laterally from spindle 60 supports the gear train composed of gears 88, 94 and 96. The gear 94 is mounted on a spindle 98 carried by plate 97, and gear 96 is fixed to a shaft 100 which is mounted rotatably in the plate 97 and also mounted for rotation in a second, parallel plate 102. This latter plate 102 is freely rotatable on a shaft 104 which constitutes a part of the motion translation assembly of which plate 70, mentioned previously, also forms a portion. A gear 106 is fixed to shaft 100, and therefore, as the gear 96 rotates, the gear 106 rotates simultaneously therewith and at the same speed. An idler gear 108 on spindle 110 in place 102, is in mesh with gear 106. The final gear 112 in this train is secured to the shaft 104 and enmeshed with gear 108. Gears 88, 94, 96, 106, 108 and 112 have similar pitch diameters. A pair of tracks 116 and 118 project from the side of plate 70 and have a slide 118 held captive therebetween. This slide is secured at the end of the plate 102, thereby constraining the motion of the plate 102. It functions to prevent rotation of the gear cluster when it is unwanted.

A longitudinal track 128 is formed in the plate 70, and a slide 128 is disposed in that track. Shaft 104 passes through an opening in slide 128, and a support plate 130 at one end of the track 126 holds the sides of the track rigid. A setscrew 132 having one end engaged with slide 128 functions as means for adjusting the slide 128 in a selected position in its track 126. By adjusting the slide in this manner, the shaft 104 is laterally displaced from its position of alignment with spindle 60.

A shuttle 134 is mounted in a longitudinal guideway 136 formed in the top wall 138 of housing 12. Sleeve 140 is passed through an aperture in shuttle 134 and is welded or otherwise rigidly fixed to a collar 142 at its lower ends. The bore of the sleeve 140 is threaded to accommodate setscrew 144 whose lower end bears upon one leg 148 of a J-shaped member. The parallel leg 150 thereof is fixed to the shaft 104. Accordingly, by loosening the setscrew 144 and moving knob 160 (Figure 3) inwardly to engage the end of screw 132, then rotating the screw 132, slide 128 may be adjusted in guideway 126. Movement of this slide causes the shaft 104 to be laterally displaced from the axis of rotation of spindle 60. After tightening setscrew 144 so that collar 142 is in a new position on the J-shaped member, actuation of shaft 50 will cause reciprocation of the shuttle 134 from one new limit to another in its track 136.

Observing Figure 2, rotation of the gears 54 and 56 will cause rotation of the spindle 60. The assembly at 166 connected to the top end of spindle 60 by housing 68 rotates with the spindle 60 and at the same speed. However, as assembly 166 rotates, every gear except fixed gear 72 rotates around spindle 60. As mentioned previously, there is a two-to-one gear ratio between gear 88 and the gear cluster 82. Therefore, if one revolution of assembly 166 is subtracted from the two revolutions at gear 88, it is apparent that if spindle 60 turns one revolution in one direction and shaft 104 is rotated in the opposite direction one revolution, through the intermediate gear train shown in Figure 2, sleeve 140 will move in a straight line as will the shuttle 134. Since the sleeve 140 passes through an opening in the shuttle 134 and actuates arm 170, any adjustment of the slide 128 will vary the travel of the arm 170.

Arm 170 is fixed at its inner end to a housing 172, the latter being welded or otherwise rigidly fixed to the top of the shuttle 134. Sleeve 140 passes through an aperture in the housing 172 so that the upper knob thereof may be accessible at all times.

It was previously assumed that the shaft 50 has a rotation input as by moving the carriage 10 around the pipe B and deriving motion therefrom. This is accomplished by an improved means for doing this. A ring gear 200 is made of two or more parts, as semicircular ring gear segments 202 and 204 which are releasably fastened together by clamps 206 (Figure 14) at the confronting ends thereof. It is preferred that each clamp consist of a pair of ears 208 and 210 which project laterally from one of the segments, as segment 202, and which fit in C-members 212 and 214 respectively. Screws 216 and 218 are placed in aligned apertures in the ears and the C-shaped clamp members. This holds the ring gear segments assembled firmly, whereby they may be placed around the pipe easily.

A circular channel 220 is formed in the ring gear 200 and opens through one face thereof. A dust guard 222 is riveted or otherwise fixed over the channel 220, and there is a ring gear 224 disposed therein. This last mentioned ring gear has teeth on a lateral face thereof which are adapted to be enmeshed with pinions, as pinion 228 (Figure 12). There are three such pinions 228 and three separate assemblies constituting clamping means for the ring gear on the pipe P. Each clamping assembly is identical in construction and consists of a housing having sections 230 and 232 respectively, the sections being bolted or otherwise rigidly secured to the ring gear 200 and having a recess 234 therein shaped to hold captive the pinion 228 but allow it to rotate. The interior bore of the pinion 228 is threaded in order to receive the threaded shank 236 that passes therethrough. This threaded shank has flats on at least one side thereof which contact the flat guides 238 and 239 on the upper and lower walls of the pinion accommodating recesses 234. Accordingly, they serve as antirotation devices for the shank 236, the lower end of which accommodates a foot 240 having a friction enhancing V-shaped slot 242 on the lower surface thereof that is adapted to come to bear against the outer surface of pipe P. Inasmuch as each of the pinion housings 245 is bolted to one surface of the ring gear 200 and has a slot in the back wall thereof in which the ring gear 224 extends, rotation of the ring gear 224 with respect to the ring gear 200 will cause rotation of all pinions 228, thereby threadedly moving each of the shanks 236 radially with respect to ring gear 200. When moved in one direction, the feet 240 thereof come to bear against the pipe P and when moved in the opposite direction, the feet 240 are moved away from the pipe P.

Means for actuating the ring gear 224 with respect to gear 200 are attached to gear 200. It is preferred that they consist of a gear case 250 bolted or otherwise rigidly fixed to one face of the ring gear 200. Case 250 comprises sections 251 and 252, the latter having a slot in the back wall thereof which is in confronting relationship to an opening in the dust shield 222. A recess 253 for the pinion 254 is formed in the sections of the housing 250 and hold the pinion 254 captive therein. A non-circular bore 256 is provided in the pinion 254 and the dimensions thereof as well as the shape are the same as those in the sprocket 42, whereby the same crank 46 may be used to actuate pinion 254 and also sprocket 42. Inasmuch as the pinion 254 is enmeshed with ring gear 224, rotation of that pinion will cause the ring gear 224 to be rotated in ring gear 200 and will effect actuation of the clamping devices for the pipe P described above.

When the ring gear 200 and its associated clamping structure is attached to the pipe P and the carriage 10 mounted on the same pipe, the means for transmitting relative movement of the carriage with respect to the ring gear 200 and hence the pipe P to which the ring gear is rigidly attached is imparted to the shaft 50. The preferred structure to serve this function is seen best in Figure 6 and consists of a pinion 260 having flanges 261 and 262 on the faces thereof. The pinion 260 is enmeshed with the ring gear 200 and the flanges 261 and 262 prevent lateral separation of the pinion and ring gear. A small gear case 264 has a shaft 266 extending therefrom and the pinion 260 is mounted on this shaft. A bevel gear 268 is also fixed to the shaft 266, but it is located within the small gear case 264. A lay shaft 270 extends through aligned bearings in the gear case 264 and has a flat or a keyway 272 for a considerable distance along its length. A bevel gear 276 having a similar flat or keyway engaged with the last mentioned flat or keyway is disposed in the gear case 264 and in engagement with the gear 268. This transmits motion of the pinion 260 to rotary motion of the lay shaft 270 inasmuch as the gear 276 is mounted on that lay shaft and drivingly connected therewith by means of the flat or keyway 272. Spacers 275 and 277 hold the gear 276 properly located in the gear case 264.

The lower end of the lay shaft 270 has a gear 278 secured to it, the latter being enmeshed with gear 279 which is keyed or otherwise fixed to the shaft 50 in such manner as to allow gear 279 to slide thereon but yet drive the shaft 50. Gears 278 and 279 are mounted in a case 280 and suitable lubricant is provided therein and in the gear case 264. Spacers 281 and 282 for the gear 279 are disposed on the shaft 50 and located in the gear case 280.

Means for mechanically connecting the cases 280 and 264 but allowing relative adjustment are attached to each. The preferred means consist of a non-circular rod 286 which is fixed at one end to case 280 and slidable through a similarly shaped opening 288 in an extension 290 projecting laterally from case 264. A setscrew 292 or other fastening device is used to hold case 264 in selected adjusted position on the rod 286.

A torque tube 294 is fixed to the case 280 and to the end wall 293 of the housing 12. Shaft 50 extending through this torque tube, passes into the housing 12 and through the bearing 52 (Figure 2).

In operation of this portion of the machine, rotation of the carriage 10 around pipe P causes rotation of shaft 50 through the gearing and shafting shown in Figure 6 and operating on ring gear 200. This shafting terminates at shaft 50 which imparts a rotation input to the transmission 48 which is proportional to the speed of movement of the carriage 10 around the pipe P. This, in turn, causes the arm 170 to reciprocate at a speed which is a function of the speed of translation of the carriage around the pipe P. The extent of travel of the arm 170 is governed by the travel of the shuttle 134, the latter being adjusted as previously described herein.

A blowpipe 298 having a suitable connection with gases by means of flexible hoses, is mounted at the end of arm 170 by means of an improved mounting construction. An inverted U-shaped support 300 having a central opening 302 through which the blowpipe 298 extends is mounted at the extreme end of the fork 304 by means of the laterally projecting and axially aligned pivot pins 306 and 307. These pins fit in openings provided in the outer ends of the fork 304 and have clamps 308 and 309 adjustably clamped thereto. Each clamp consists of a generally U-shaped strap-like member having a screw passed therethrough with a nut on the end thereof. Vertically rising levers 310 and 311 are attached to the clamps 308 and 309 and they are non-circular in cross-section, preferably square or rectangular. Sliding collars 312 and 314 are disposed on the levers 310 and 311 so that the outer ends of a fork 316 may be pivoted thereto, as at 318. Fork 316 constitutes a part of a push rod 320 which functions to tilt the blowpipe support 300 about an axis 322 which is passed through the pivot pins 306 and 307. The ultimate function is to cut a bevel on the cut which is made by the blowpipe 298. Vertical adjustment of the blowpipe is accomplished by adjustment of the usual adjusting mechanism 324, such as a rack and pinion type.

Push rod 320 passes through guides 326 and 328 on the arm 170, and the inner end of rod 320 terminates in a plate 330 which is seated upon housing 172. Guides in the form of plates 332 are provided on the sides of the housing and serve to constrain the movement of the rod 320 so that plate 330 and hence arm 320 must reciprocate rather than rotate.

Means for imparting reciprocatory movement to the push rod 320, which movement is a function of the speed of translation of the carriage 10 around the pipe P are provided in the housing 172. The preferred means consist of a gear 336 which is keyed or otherwise fixed to the sleeve 140, together with a second gear 338 enmeshed with gear 336. This latter gear is mounted for rotation on a spindle 340 fixed in the housing 172 and has a recess 342 in the upper surface thereof. This recess accommodates the inner end of shank 344, this shank having an actuating knob 346 at the upper end thereof. This knob is fixed to an internally threaded sleeve 348 which is threaded on the shank 344. A nut 350 in the recess 332 and on the shank 344 allows the shank 344 and sleeve 348 to be adjusted in selected positions in slot 352 formed in an upper plate 354. This upper plate is rigidly secured to the top surface of gear 338 so that it is rotatable therewith.

The sleeve 348 functions as an eccentric inasmuch as it may be adjusted in any position in the slot 352 and any position in the slot 358 which is formed in plate 350 and aligned with slot 352. Therefore, adjustment of the sleeve 348 in the slot 358 will govern the extent of travel of the push rod 330, thereby causing the bevel on the miter which is cut by the flame from blowpipe 248 to be adjusted in accordance with the type of stock which is used for the work piece P.

In operation of the portion of the apparatus which makes the cuts in the pipe P, motion is derived from the transmission 48 in order to actuate arm 170 and also push rod 320. Reciprocation of the arm 170 causes the miter in the cut to be made in pipe P. If the adjustment of the screw 132 moves slide 128 to such position that there is no reciprocation of housing 172 with shuttle 134, the cut of the pipe will be square. However, if there is movement of arm 170, a miter cut is formed in pipe P. Prior to taking a cut, the throw of the push rod 320 is regulated by adjustment of the sleeve 348 in its slots, as described previously. This causes the push rod to be reciprocated, thereby tilting the blowpipe support 300 through the levers 311 and 310 and slidable collars 312 and 314 thereon. The motions or arm 170 and rod 320 and hence the tilting movement of the blowpipe support 300 are timed precisely with the motion of the carriage 10 around the pipe P. In order to make certain that the blowpipe 298 does not move from the proper position with respect to the surface of the pipe P in taking the entire cut, the axis of rotation 322 is on or very close to the surface of the pipe P. In order to adjust the tilt of the blowpipe longitudinal axis and hold it as the datum from which to start and complete the cutting operation, the clamps 308 and 309 are used in making this adjustment.

Various modifications may be made herein without departing from the invention. For example, a level 363 may be placed on the carriage 10 in order to make certain that the blowpipe 298 is in proper position to make an effective miter, radial or other cut with the proper bevel angle thereon.

What is claimed as new is as follows:

1. In a pipe mitering and beveling machine wherein the bevel is maintained always in a predetermined relation with the angle or miter cut, means including an arm for supporting a blowpipe, means for causing relative rotation between said arm and the pipe, means for reciprocating said arm in a plane extending longitudinally of the pipe to form a miter cut therein, means including a push rod for tilting the blowpipe to cut a bevel on the miter at an angle which is constant when measured with respect to the miter angle, said blowpipe supporting means also including a blowpipe holder having a pivot pin with a longitudinal axis an extension of which passes perpendicularly through the central longitudinal axis of the blowpipe and at the lower end of the blowpipe so that when said blowpipe is tilted, the tip thereof remains a fixed distance from the pipe, said blowpipe tilting means also including a lever connected to said pivot pin, a sliding collar on said lever, and a pivot connecting said push rod to said collar.

2. The machine of claim 1 wherein there is a clamp adjustably connecting said lever to said pivot pin so that said holder and the blowpipe carried thereby may be adjusted to cut a selected angle of bevel.

3. In a pipe mitering and beveling machine having a blowpipe support, means to reciprocate the support while relatively rotating the support and pipe in order to form a miter cut in the pipe, said support reciprocating means including an arm, a gear transmission, said arm being driven by said gear transmission, a pivot pin at the outer end of said arm and reciprocable therewith, a push rod, means at one end of said rod connecting the latter to said transmission to actuate said rod in response to actuation of said transmission, means connected with said rod actuating means for adjusting the extent of travel of said push rod, and means drivingly connecting the outer end of said push rod to said blowpipe support to pivotally actuate said blowpipe support in response to reciprocatory movement of said push rod, the last mentioned means consisting of a clamp secured to said pivot pin, a lever extending from said clamp, a collar movably mounted on said lever, and means pivotally connecting the outer end of said push rod to said collar.

4. In a machine for thermochemically cutting metal stock wherein there is relative motion between the stock and machine, a mechanical element, means for rotating said element at a speed proportional to the relative movement between the machine and the stock and for orbitally moving said element, an arm, means connecting the inner end of said arm to said element for reciprocatory movement of said arm in response to the orbital movement of said element, a blowpipe support, means pivotally connecting said blowpipe support to the outer end of said arm, means responsive to the rotation of said element for tilting said support while it is being reciprocated by said arm, including a push rod, means for selectively adjusting the extent of movement of said push rod, means movable relative to said support drivingly connecting said push rod to said support said movable means including a lever, and a sliding connection assembly connecting the outer end of said arm to said lever.

5. The machine of claim 9 and a clamp from which said lever extends, said clamp being operatively connected to said means for pivotally connecting said support to said arm to adjust and fix said support in selected angular positions.

6. In an apparatus for thermochemically cutting pipe wherein there is a blowpipe support and relative movement between the pipe and support, an arm on which said support is pivotally mounted, a push rod connected to said support, the improvement comprising: a mechanical element, means responsive to said relative movement for both orbitally displacing and rotating said element, means responsive to the orbital movement of said element for reciprocating said arm, means responsive to the rotary movement of said element for actuating said push rod, a transmission to which said element is operatively connected, a carriage adapted to be mounted for movement on the pipe and in which said transmission is disposed, means mounted on the pipe for actuating said transmission at a speed proportional to the speed of the carriage on the pipe, said transmission actuating means including a first gear, adjustable means fastening said gear to the pipe, a second gear enmeshed with said first gear, shafting connected with said second gear and driven thereby, means drivingly connecting said shafting with said transmission, said shafting including a lay shaft, a gear slidable thereon for driving said lay shaft, means drivingly connecting said second gear with said last mentioned gear, and means adjustably supporting said second gear and the last mentioned gear at selected positions with respect to said transmission.

7. In a blowpipe machine, a support for the blowpipe, an arm to which said support is pivotally attached, means connected with said support for pivotally actuating said support in order to cut a bevel, means for reciprocating said arm so that when said blowpipe is held in juxtaposition to a pipe and there is relative rotation between the pipe and blowpipe, a miter cut is made in the pipe on which said bevel is present, and adjustable means connected to the pipe and including a plurality of members simultaneously movable toward and away from the pipe to clamp said adjustable means to the pipe, for actuating said arm and said rod at speeds which are functions of the speed of the relative movement between said pipe and said blowpipe.

References Cited in the file of this patent

UNITED STATES PATENTS

| | | |
|---|---|---|
| 2,138,676 | Hull et al. | Nov. 29, 1938 |
| 2,408,517 | Howard | Oct. 1, 1946 |
| 2,495,360 | Young | Jan. 24, 1950 |
| 2,509,698 | Rudisell | May 30, 1950 |